Patented Oct. 27, 1925.

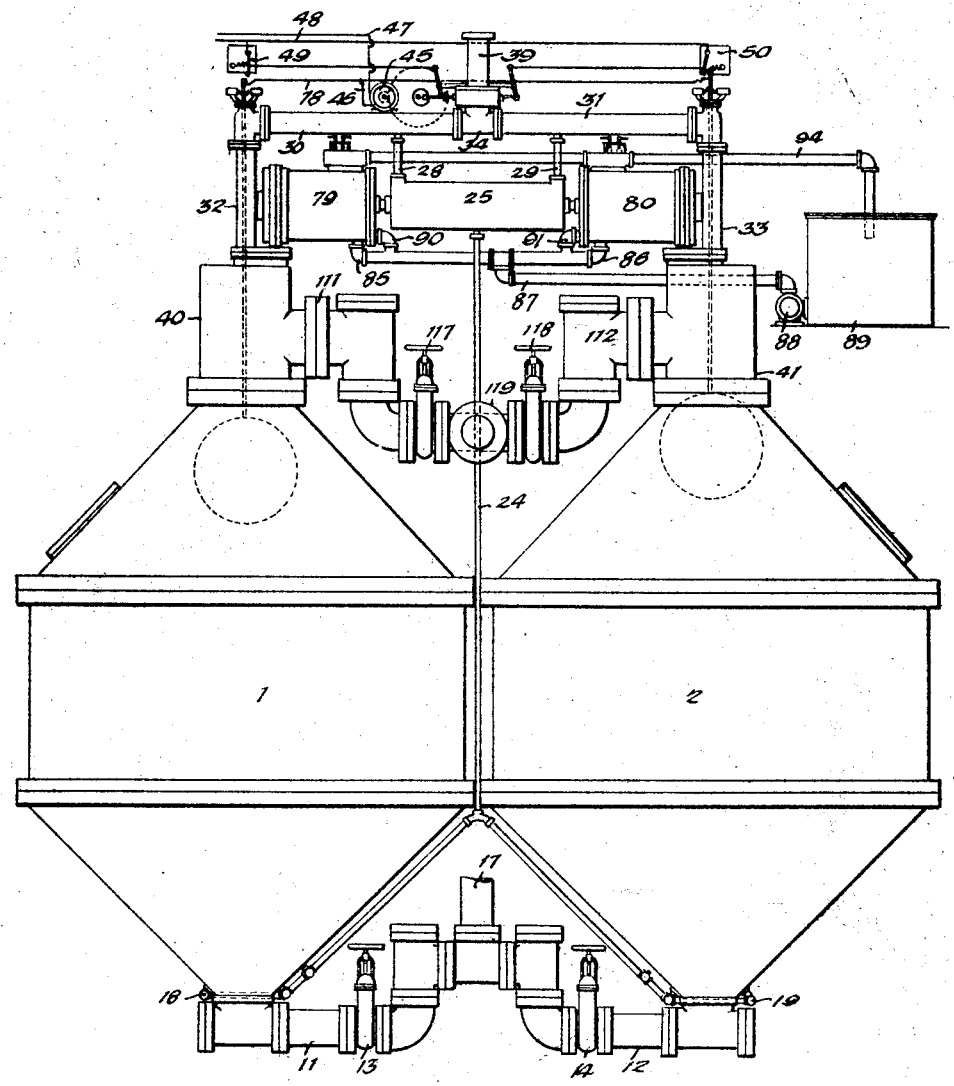

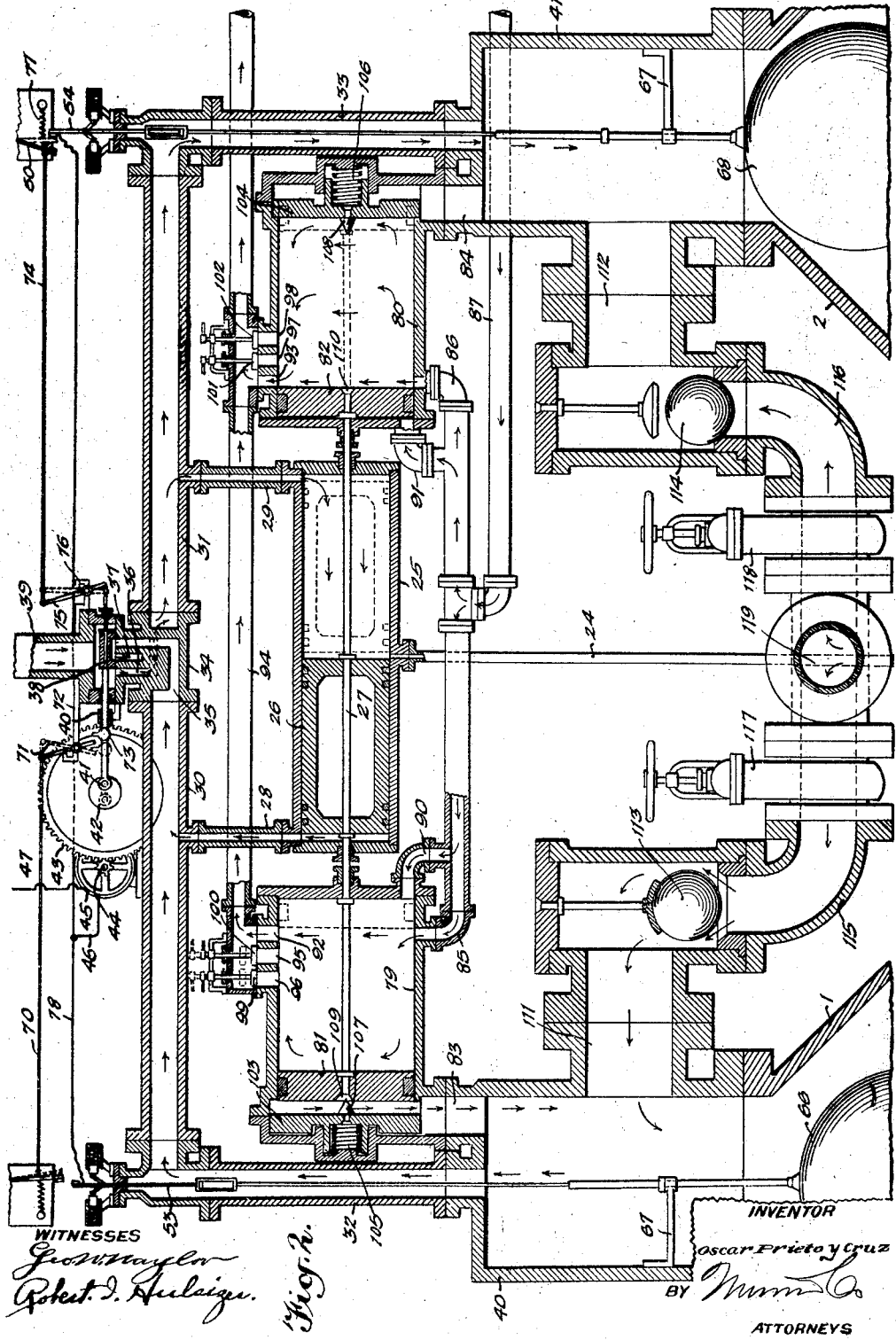

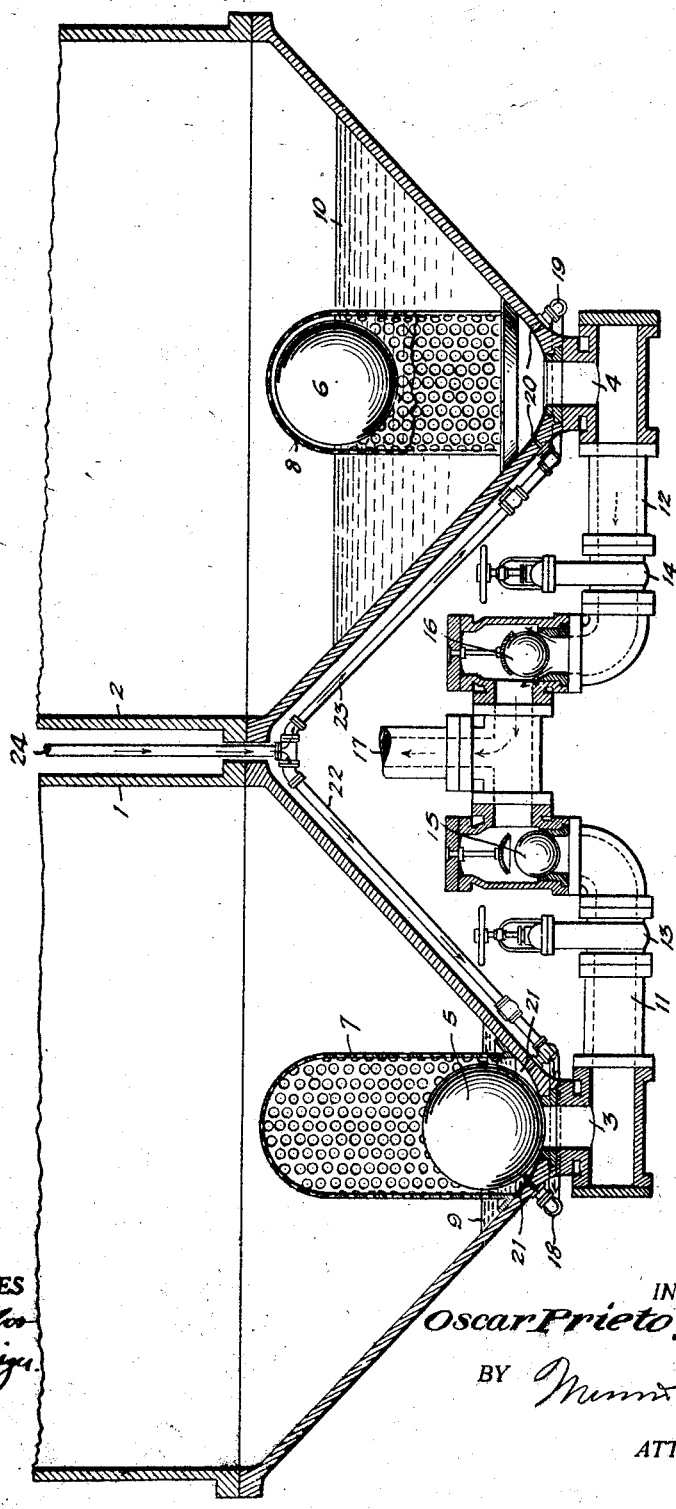

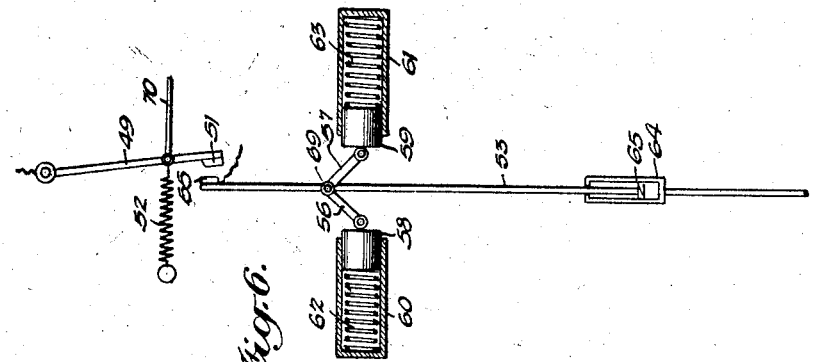
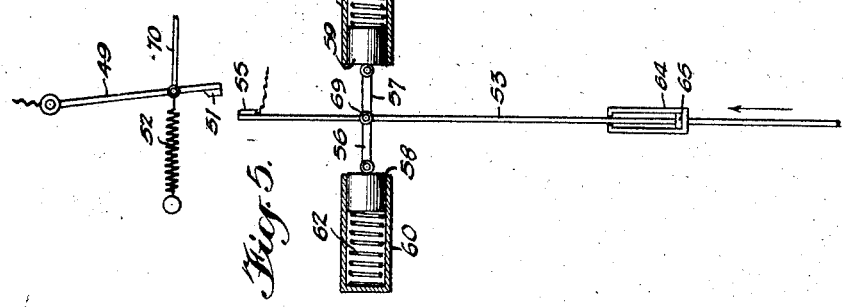
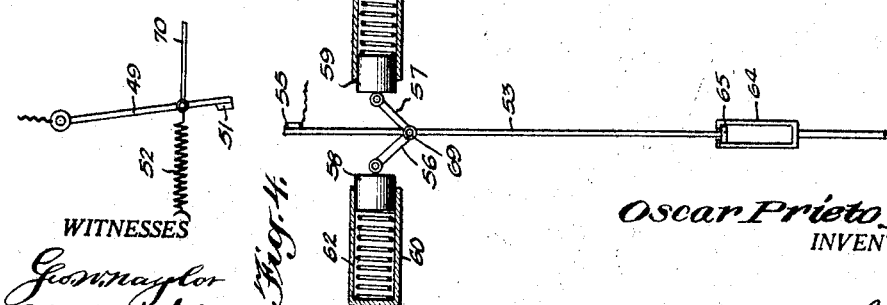

1,558,669

UNITED STATES PATENT OFFICE.

OSCAR PRIETO y CRUZ, OF PONCE, PORTO RICO.

MIXING APPARATUS.

Application filed June 6, 1923. Serial No. 643,805.

*To all whom it may concern:*

Be it known that I, OSCAR PRIETO Y CRUZ, a citizen of Porto Rico, West Indies, and a resident of Ponce, Porto Rico, West Indies, have invented a new and Improved Mixing Apparatus, of which the following is a full, clear, and exact description.

This invention relates to a mixing apparatus, and particularly to apparatus for mixing the proper proportion of lime with sugar juices.

An object of this invention is to provide substantially automatic apparatus whereby determinable amounts of lime may be added to the charge in each tank as the charge is introduced into the tank, and properly mixed therewith.

Another object concerns the provision of means whereby one or more pairs of tanks are alternately filled and discharged, the one being filled while the other is being discharged.

A further object concerns the provision of means whereby the flow of liquid into the various tanks is controlled by the application to and the removal of pressure from said tanks. This pressure control is effective through the intermediary of a gas, such as compressed air; and the flow of this gas is controlled by suitable valve mechanisms.

A still further object concerns the provision of means under the control of the level of liquid in the various tanks for causing the automatic movement of the pressure controlling valve.

Another object concerns the provision of means whereby flow of the gas pressure in one direction or another controls and actuates means for regulating and effecting the control of the flow of the lime solution.

The invention is illustrated in the drawings, of which—

Figure 1 is an elevation of the entire apparatus;

Fig. 2 is a section taken through the upper part of the apparatus, including the apparatus for controlling the flow of sugar juices and lime solutions to the tank;

Fig. 3 is a section taken through the lower part of the tank disclosing the constructions of the discharge mechanism and associated apparatus; and Figs. 4, 5 and 6 are semidiagrammatic views of the various positions assumed by the apparatus for controlling the movement of the pressure regulating valve.

The form of the invention shown in the drawings is a preferred form, although it is understood that modifications in the construction and arrangement of the parts and in the character of the materials used may be adopted without departing from the spirit of the invention.

In general a typical unit of my apparatus includes a pair of tanks which are so operated that one tank is filling with sugar juice while another tank is emptying. Means are provided whereby the tank which is emptying will be emptied in a shorter time than the period required to fill the other tank, both tanks being of the same size. Means are provided for causing the introduction of lime solution into the tank which is filling and the opening of said tank at the same time to the atmosphere, whereas, on the other hand, the tank which is emptying is being subjected to gas pressure to assist in the discharge of the sugar juices therefrom.

As the one tank is filling, suitable level controlled apparatus is actuated and at the achievement of a definite level will cause the energization of a motor or other apparatus to move a gas-controlling valve, whereby the application of pressure and atmosphere to the tanks will be reversed, so that the tank formerly connected to the atmosphere and now filled with sugar juice will be subjected to gas pressure, and the tank formerly subjected to gas pressure will be connected to the atmosphere. This reversal of gas pressure is likewise caused to effect the operation of a gas-impelled piston or plunger the movement of which controls the introduction of the lime solution into the tank. This gas control of the lime introduction causes the reversal of movement of the lime-introducing apparatus substantially at the same time that the above-mentioned reversal of gas pressure takes place in the tanks, so that lime solution is introduced into the tank which is now connected to the atmosphere and is shut off from the tank which is now subjected to gas pressure.

The introduction of sugar juice takes place automatically by reason of the relation between the pressures applied to the tank and the action of certain check valves which when subjected to pressure on one side will prohibit the introduction of juice, but which when released from pressure on this side will permit the introduction of juice.

Therefore, it will be observed that I have provided means for automatically controlling the flow of lime solution and sugar juices successively and in order to either one of a pair of juice tanks, this flow taking place alternately in order, and the alternation and reversal of application of the juices and lime to the tank being controlled and achieved automatically by means of gaseous pressure operated apparatus, the flow and application of the gaseous pressure being controlled by mechanism under the influence of the liquid level in the pair of tanks.

The preferred form of the invention shown in the drawings includes a pair of sugar tanks 1 and 2, preferably each having sloping tops and bottoms. The bottoms of the tanks, as shown in Fig. 3, are provided with discharge openings 3 and 4 which are adapted to be closed by ball valves 5 and 6 partially restrained within perforated metallic cages 7 and 8. When the liquid level has been reduced to that indicated in Fig. 3 at the left by the numeral 9, the ball valve will be seated to prevent the outflow of further liquid and any gas pressure which may be behind the liquid. When the liquid reaches the level indicated at 10 in Fig. 3, the ball valves will float within the cage but will be restrained from reaching a higher position than that indicated. The bottoms of the tanks are connected to outlet pipes or conduits 11 and 12 in which are disposed gate valves 13 and 14 and check valves 15 and 16. These conduits lead to a common discharge pipe 17. The check valves 15 and 16 are disposed to permit liquid to flow from the tanks to the discharge pipe 17 but are disposed to prevent liquid flowing in the reverse direction.

Surrounding the bottom of each tank adjacent the ball valves 5 and 6 are rings of pipe 18 and 19 provided with jets 20 and 21 through which gas may be introduced into the bottom of the tank and cause it to bubble up or be forced violently through the liquid into the tank by means of this pressure, whereby the liquid within the tanks is agitated and thoroughly mixed so as to cause the proper mixing to take place between the lime solution and the sugar juices. These rings are connected to pipes 22 and 23 which in turn connect with a common pipe 24.

This pipe 24 is connected to the mid portion of a gas pressure cylinder 25, shown in Fig. 2. In this cylinder a piston 26 is adapted to reciprocate and is fixedly connected to a piston rod 27. The ends of this cylinder 25 are connected by pipes 28 and 29 to conduits 30 and 31. These conduits 30 and 31 connect to pipes 32 and 33 leading to heads 40 and 41 mounted on the tops of the tanks 1 and 2. At the adjacent ends of pipes 30 and 31 there is a valve casing 34 in which are formed inlet passages 35 and 36 and an outlet passage 37. The flow of fluid through these passages is controlled by a valve 38 constructed to operate similarly to the action of a valve in a steam cylinder. To the upper end of this valve casing 34 a fluid admission pipe 39 is connected. The fluid-control valve 38 is connected to a valve stem 40$^a$. This valve stem 40$^a$ is connected at its opposite end to a crank pin 41$^a$ mounted eccentrically on a disk 42 connected to a gear 43 meshing with a pinion 44 mounted on the shaft of a motor 45.

This motor is connected, as shown particularly in Figs. 1 and 2, to wires 46 and 47, wire 47 leading to the power main. Another power wire 48 is connected to two contact arms 49 and 50. These contact arms are provided on their lower ends with heads 51, shown in Figs. 4, 5 and 6, and each is connected to a spring 52 which normally tends to hold the arms in a normal vertical position. In this normal position these arms are adapted to be engaged by the upper ends of stems 53 and 54 projecting upwardly through the pipes 32 and 33 from the tops of the tanks 1 and 2.

Turning to Figs. 4, 5 and 6, I will describe the construction and operation of one of these stems, which is identical for both of them. For instance, the stem 53 is provided at its upper end, preferably, with a cam head 55. This stem is connected to two links 56 and 57 equal in length and connected to the stem at the same point. The opposite ends of these links are connected to pistons or plungers 58 and 59 disposed on opposite sides of the stem and moving in cylinders or dashpots 60 and 61 and backed or opposed by the force of springs such as 62 and 63. The stem is provided midway its length with a cylindrical member 64 in which a small piston head 65 formed on one part of the stem is adapted to slide, for a reason hereinafter to be made clear. The lower end of the stem 53 is provided with a float ball or sphere 66. The stem is guided by passing through a bearing on a bracket member 67 connected to the head 40. It will be understood that the stem 54 connected with the tank 2 is constructed likewise and provided with a floating sphere 68. The positions of these spheres are controlled by the level of the liquid within the tanks 1 and 2. In the position of the sphere 66 shown in Fig. 1, the stem 53 is in its lowest position and the connecting point of the links 56 and 57 is disposed below the line of the pistons 58 and 59. However, as the level of the liquid in the tank 1 rises, the stem will be forced upward; and this will elevate the pivot point 69 until, as shown in Fig. 5, it is in line with the axes of the two dashpots 60 and 61. In this position the two springs are compressed and their opposing forces are exactly in line and opposite, thereby balancing each other. However, the slightest movement of the stem 53 above this neutral position, shown in Fig. 5, will cause the action of the spring to move the upper end of the stem a slight distance further. In so doing the upper end of the stem of the head 55 will engage with the lower end 51 of the contact arm 49 and move it to the right against the action of the spring 52. The contact arm 49 is connected to a link 70, and this link 70, as shown in Fig. 2, is connected to a lever 71 pivoted to a bracket 72 and having its lower end dependent in the path of a projection or lug 73 on the valve stem 40ª.

Likewise, the contact arm 50 is connected to a link 74 which in turn is connected to a lever 75 mounted on a bracket 76 and having an end depending in the path of the end of the valve stem 40ª. It will be observed that the cam head on the upper end of the floating stem 54 is disposed in such direction as to tend to move the contact arm 50 to the left whenever it engages therewith, this movement taking place in opposition to the tendency of the spring 77. The upper ends of the stems 53 and 54 are connected by a wire 78 and to this wire one of the motor lead wires 46 is connected.

Referring back to the gas pressure operating piston 26 mounted on the piston rod 27 within the cylinder 25, the ends of this piston rod 27 are extended in opposite directions and project into cylinders 79 and 80 disposed at opposite ends thereof. These cylinders 79 and 80 are adapted to receive the lime solution. On the ends of the piston rods 27 within these cylinders are disposed pistons 81 and 82. These cylinders are provided with discharge ports 83 and 84 leading to the heads 40 and 41 on the upper ends of the tanks 1 and 2. These cylinders are also provided with fluid admission pipes 85 and 86. These pipes connect to a common conduit or pipe 87 leading, as shown in Fig. 1, to a pump 88 connected to a lime solution tank 89 from which the lime solution or fluid is pumped under pressure into the cylinders. For reasons hereinafter to be set forth, the admission pipes 85 and 86 are provided with bypass pipes 90 and 91 leading to the rear wall of each of the cylinders 79 and 80. These cylinders 79 and 80 are also provided with normal discharge ports 92 and 93 connecting to a pipe 94 leading back into the tank 89. These cylinders are also provided with auxiliary return discharge ports, such as 95, 96, 97 and 98; these auxiliary return discharge ports being controlled by valves 99, 100, 101 and 102. The normal return discharge ports 92 and 93 are disposed nearest to the admission end of the cylinders, and the auxiliary return discharge ports are disposed in order adjacent the normal ports. The ends of the cylinders 79 and 80, opposite the admission pipes 85 and 86, are provided with slidable abutment plates or heads 103 and 104. These abutment heads are backed by springs 105 and 106.

The front face of each of these abutment heads or plates is provided with a conical projection 107 and 108 adapted to fit into similarly shaped recesses 109 and 110 formed on the front face of the pistons 81 and 82.

The admission of sugar juices into the tanks 1 and 2 is effected through admission passages 111 and 112, the fluid flowing thereto being controlled by check valves 113 and 114 leading to pipes 115 and 116 in which are disposed gate valves 117 and 118 leading to a common pipe or conduit 119. These check valves 113 and 114 are adapted to act to admit sugar juice into the respective tanks when the gas pressure within the tank is released or reduced below a definite amount, and are adapted to automatically close when the pressure within the tank exceeds a certain amount.

In describing the operation of the device, I will begin the description of the operation with the parts in the positions in which they are shown in the figures. Referring particularly to Fig. 2, the operation of the device as shown is such that the tank 1 on the left is, through the pipes 30 and 32, connected to the atmosphere through the passage 35, the valve 38 and the outlet passage 37. On the other hand, the tank 2 on the right is connected through pipes 33 and 31 and passage 36 with valve 39 leading to a source of fluid pressure, preferably air pressure, so that the tank 2 is being subjected to the pressure of a gas or fluid which forces the mixture of sugar juice and lime solution out of tank 2. The air pressure on tank 2, at the same time, will keep check valve 114 on its seat so that a new charge of sugar juice cannot flow in. At the same time the high level of liquid in tank 2 causes the ball valve 6 in the bottom of the tank to be lifted off its seat so that the liquid may be discharged therefrom. However, the weight of the liquid in the tank 2 is not sufficient to lift the check valve 16 from its seat unless air pressure or gas pressure is applied to the tank as is now the case during the time under consideration. At this same instant or period of time the abutment plate 104 in the cylinder 80, as the piston 82 moves to the left is forced by the spring 106 to the left to close the discharge port 84 leading to the tank 2 from the cylinder 80. During this period the piston 82 is at the extreme left of the cylinder 80 and uncovers the admission pipe 86 so that lime solution can flow into the cylinder and circulate therethrough and out the return discharge port 93 as well as the ports 97 and 98, if the valves 101 and 102 have been lifted. The lime solution, therefore, circulates around this circuit. The piston 82 has been moved to this position by the action of the piston 26 in the cylinder 25, because the instant that air pressure is applied to tank 2 through the conduit 31 some of it passes down the pipe 29 and has instantly moved the piston 26 from the dotted position shown in Fig. 2 to the full line which is now under consideration. The movement of the piston 26 to the left end of its stroke has moved the piston 81 in the cylinder 79 to the left end of its stroke. Now when the piston 81 moves to the left from the dotted position thereof, shown in Fig. 2, the first thing that happens is the passage of the piston beyond the admission pipe 85 and substantially immediately thereafter its passage beyond the return discharge port 92 for the lime solution. This prevents the further flow of lime into the space to the left of the piston. There are no further discharge ports to close, unless one or more of the valves 99 and 100 happen to be open. By reason of this construction in these two cylinders 79 and 80, namely, the provision of these auxiliary return discharge ports and valves, the amount of lime solution trapped in the respective cylinders can be controlled so that the amount of lime solution delivered to the sugar tanks can be regulated. As the piston 81 advances beyond the last return discharge port, the trapped lime solution is put under pressure, and this causes the recession of the abutment plate 103. This recession opens the cylinder to the port 83 leading to the head 40 on top of the tank 1 and permits the lime solution to pass into said tank. By reason of the fact that this tank has been opened to the atmosphere, the pressure of the sugar juices through the pipe 115 on the under side of the check valve 113 will lift the valve off its seat and permit the sugar juices to pass into the tank 1 with the lime solution.

The instant that air pressure or gas pressure is applied to tank 2, the discharge of said tank commences, and, consequently, the ball or sphere float 68 commences to descend and in descending will lower the upper end of the stem 54. As previously described, as this stem lowers it moves the links 56 and 57 to their neutral points, and then the slightest movement below this point will cause the springs 62 and 63 to be brought into action to snap the upper end of the stem downwardly in a rapid manner to break any connection that may exist between the upper end of the stem and the contact arm 50.

At the same time, the ball float 66 is being elevated because of the fact that the tank 1 is being filled, and as this float is elevated, the upper end of the stem 53 goes through an operation reverse to that just described with respect to the stem 54, consequently, as it reaches the upper end of its movement the head 55 encounters the head 51 on the lower end of the contact arm 49 and tends to move it slightly to the right. This contact, however, immediately establishes a circuit for the motor 45 over the following circuit: From wire 48, contact arm 49, wire 78, wire 46, motor 45, wire 47, back to the power line again. This energization of the motor is maintained from the instant the stem 53 makes contact and the motor starts to operate, rotating the gear 43 to move the crank or valve stem 40$^a$ to the left from the position shown in Fig. 2. This movement to the left causes the movement of the projection or lug 73 thereon which encounters the lower end of the lever 71, tending to move its upper end to the right. The movement of the upper end to the right will withdraw the contact arm 49 from engagement with the stem 53 and thus open the circuit of the motor; but this disengagement is not complete until the momentum of the motor is sufficient to cause the valve stem to be moved to its extreme left-hand position. The movement of the valve 38 to the left from the position shown in Fig. 2 will cause a reversal in the action and application of the air pressure so that from this instant on the air pressure is applied to the tank 1 and the atmosphere is applied to the tank 2, consequently, some of the air pressure will proceed down the pipe 28 into the cylinder 25 and throw the piston 26 to the right and with it move the pistons 81 and 82 to the right. The movement of the piston 81 to the right will permit the advance of the abutment plate 103 under the action of spring 105 whereby the port 83 is closed. The air pressure in tank 1 will prevent the opening of the check valve 113 so that no more sugar juice can get into this tank. The provision of the by-pass pipe 90 in connection with cylinder 79 will permit the piston 81 to move past the admission pipe 85 and any lime juice trapped behind the piston will be forced out through the by-pass pipe 90, thereby permitting the movement of the piston 81 right up to the end of the cylinder. As soon as the piston 81 passes beyond or to the right of the admission pipe 85, it will be seen that the lime solution will immediately commence to flow into the cylinder again in front of the piston and circulate therethrough in the manner above described.

When the piston 82 moves to the right it goes through the same process as has been previously described with respect to the advance of piston 81, namely, it passes beyond the admission port or pipe 86 and then, successively, the return admission ports 93, 97 and 98, and then by further advance causes the recession of the abutment plate 104, whereby lime solution can be fed through the port 84 into the head 41 and the tank 1. The admission of atmospheric pressure to the tank 2 through the conduit 31 by reason of the movement of the valve 38 will permit the sugar juice pressure on the underside of check valve 114 to lift the valve and permit the sugar juice to run into this tank. The tank 1 now commences to empty and, therefore, the stem 53 commences to drop and, at the same time, since the tank 2 is now filled up the stem 54 will commence to be elevated until contact is again made in the manner above described, so that the motor will be temporarily energized to cause the reversal of the valve 38. It will be noted that as soon as the piston 26 passes to either end of the cylinder 25, the pipe 24 is uncovered and through this pipe air pressure extends to the rings 18 and 19 and through the jets 20 and 21. However, air will only pass through these jets into the tanks when the gas pressure is not being applied to these tanks. In other words, these jets are only effective to agitate and mix the lime solution with the sugar juices when the tanks are being filled, namely, when the gas pressure has been released or removed from said tanks.

It will be noted that the engagement of the conical projections 107 and 108 with corresponding recesses in the ends of the pistons 81 and 82 not only keep the pistons and the abutment plates in alinement but also prevent the abutment plates from getting too close to the pistons.

In considering the operation of these tanks, the air pressure is removed from tank 2 while the gate valves 13 and 117 are closed and until the tank 2 is filled to the proper level and the stem is elevated to energize the motor, at this instant the gate valves 117 and 13 are opened. At this instant the motor has reversed the connection of the pressure so that pressure is now applied to tank 2 and released from tank 1, so that tank 2 can be discharged and tank 1 can be filled. From this point on the operation is automatic.

It will be observed that I have provided a relatively simple, efficient apparatus whereby the mixing of determinable proportions of lime solution and sugar juices can be continually and automatically effective, requiring minimum attention on the part of an operator and involving an apparatus which is to a minimum extent liable to get out of order and need repair.

It is, of course, understood, although not shown in the drawings and not forming part of this invention, that suitable pressure gages and charts can be connected automatically to the apparatus so that the amount of liquid, both sugar juices and lime solution, can be charted whereby the total amounts passing through the apparatus in a given period of time can be recorded.

What I claim is:—

1. An apparatus for handling sugar juices, which includes a pair of tanks, inlet and discharge pipes leading from said tanks, check valves in said inlet and discharge pipes, means for feeding the juice to said tanks under pressure, said valves in the inlet pipes adapted to admit the juice except when a counterbalancing pressure is introduced into the tanks, said valves in the discharge pipes adapted to permit the discharge of fluid therethrough only when pressure is applied to the tanks, a source of fluid pressure, conduits connecting said source to said tanks, a fluid controlling valve in said conduit, means for operating said valve, and means adapted to be actuated in accordance with the liquid level in said tanks for controlling said valve operating means, said valve adapted to connect the source of fluid pressure to one tank while admitting atmospheric pressure to the other tank.

2. An apparatus for handling sugar juices, which includes a tank to receive said juices, admission and discharge conduits connected to said tank, check valves in said conduits, the valve in the inlet conduit permitting the flow of fluid into said tank when said tank is connected to the atmosphere, the valve in the discharge conduit permitting the discharge of the fluid from said tank when pressure is applied to said tank, a source of fluid pressure, connections between said source and said tank, a valve mechanism in said connections to control the application of pressure to said tank, a float valve in said tank, electrical means for operating said valve mechanism, and circuit closing means actuated by the float valve to energize the electrical valve operating means and open connection between the source of fluid pressure and the tank when the liquid level in the tank has reached the desired maximum.

3. In a sugar juice handling apparatus, the combination of a pair of juice tanks, pressure controlled means for admitting juices to and discharging juice from said tanks, means adapted to be actuated by the liquid level in said tanks for controlling the application of fluid pressure to said tanks and the release of said fluid pressure from said tanks to facilitate the admission and discharge of juices, fluid pressure controlled means for introducing definite quantities of a second fluid with the sugar juices, said last mentioned means being operated by the fluid pressure applied to the tank.

4. In a sugar juice handling apparatus, the combination of a pair of juice tanks, pressure controlled means for admitting juices to and discharging juices from said tanks, means actuated by the liquid level in said tanks for controlling the application of fluid pressure to said tanks and the release of said fluid pressure from said tanks to facilitate the admission and discharge of juices, fluid pressure controlled means for introducing definite quantities of a second fluid with the sugar juices, said last mentioned means being operated by the fluid pressure applied to the tank, and fluid pressure means for blowing and agitating the charge of juice and additional fluid as it is being introduced into the tank.

5. An apparatus for handling sugar juices, which includes a pair of sugar juice tanks, means for admitting juices to said tanks under pressure, means for introducing determined quantities of lime solution into said tanks, means for applying fluid pressure to and removing fluid pressure from said tanks, and means for causing the lime-introducing means to operate so as to introduce the lime into a tank at the same time that the fluid pressure means is removing the pressure from said tank.

6. An apparatus for handling sugar juices, which includes a pair of sugar juice tanks, means for admitting juice to said tanks under pressure, means for introducing determined quantities of lime solution into said tanks, means for applying fluid pressure to and removing fluid pressure from said tanks, and means for causing the lime-introducing means to operate so as to introduce the lime into a tank at the same time that the fluid pressure means is removing the pressure from said tank, and means controlled by the level of the liquid within the tank for controlling the application of pressure to the tanks.

7. A sugar juice handling apparatus, which includes a tank, liquid level operating means for controlling the application of fluid pressure to said tank, means for introducing lime solution in said tank, said lime solution introducing means adapted to be actuated by said fluid pressure, and a fluid pressure blowing means connected with the bottom of said tank and actuated by the fluid pressure for actuating the lime solution introducing means.

8. An apparatus for handling sugar juices, which includes a tank, automatic means for introducing sugar juices thereto under pressure, automatic means for controlling the application of pressure to said tank, and automatic means for introducing determined amounts of lime solution into said tank, said last-mentioned means being controlled by the means for controlling the application of pressure to said tank.

OSCAR PRIETO y CRUZ.